United States Patent
Jeaugey et al.

(10) Patent No.: US 9,886,330 B2
(45) Date of Patent: Feb. 6, 2018

(54) DOUBLE PROCESSING OFFLOADING TO ADDITIONAL AND CENTRAL PROCESSING UNITS

(71) Applicant: BULL, Les Clayes sous Bois (FR)

(72) Inventors: Sylvain Jeaugey, Meylan (FR); Zoltan Menyhart, Grenoble (FR); Frederic Temporelli, Echirolles (FR)

(73) Assignee: BULL, Les Clayes sous Bois (FR)

( * ) Notice: Subject to any disclaimer, the term of this patent is extended or adjusted under 35 U.S.C. 154(b) by 0 days.

(21) Appl. No.: 14/501,126

(22) Filed: Sep. 30, 2014

(65) Prior Publication Data

US 2015/0095920 A1 Apr. 2, 2015

(30) Foreign Application Priority Data

Oct. 1, 2013 (FR) ...................................... 13 59501

(51) Int. Cl.

| | |
|---|---|
| *G06F 9/46* | (2006.01) |
| *G06F 9/45* | (2006.01) |
| *G06F 9/50* | (2006.01) |
| *G06F 9/44* | (2006.01) |
| *G06F 9/54* | (2006.01) |

(52) U.S. Cl.
CPC ............ *G06F 9/542* (2013.01); *G06F 9/5027* (2013.01); *G06F 9/5044* (2013.01); *G06F 9/5088* (2013.01); *G06F 2209/509* (2013.01); *G06F 2209/547* (2013.01)

(58) Field of Classification Search
CPC .................. G06F 9/5072; G06F 9/505; G06F 2209/5017; G06F 2209/5018; G06F 21/57; G06F 21/78; G06F 9/30014; G06F 9/30036; G06F 9/30167; G06F 9/30032; G06F 9/3885; G06F 8/456; G06F 2201/865; G06F 2209/509; G06F 2209/547; G06F 9/542; G06F 9/5027; G06F 9/5044; G06F 9/5088; B41J 2/04505; B41J 2/04508
See application file for complete search history.

(56) References Cited

U.S. PATENT DOCUMENTS

| | | |
|---|---|---|
| 5,355,453 A | 10/1994 | Row et al. |
| 7,689,702 B1 | 3/2010 | Tripathi et al. |
| | (Continued) | |

OTHER PUBLICATIONS

Zhang et al., High-performance online spatial and temporal aggregations on multi-core CPUs and many-core GPUs, Nov. 2012, 8 pages.*

(Continued)

*Primary Examiner* — Thuy Dao
(74) *Attorney, Agent, or Firm* — Young & Thompson

(57) ABSTRACT

A data-processing system (DTS) includes a central hardware unit (CPU) and an additional hardware unit (HW), the central hardware unit (CPU) being adapted to execute a task by a processing thread ($T_M$), and to trigger offloading of execution of a first part (P1$a$, P1$b$, P2) of the task to the additional hardware unit (HW); and wherein the additional hardware unit is adapted to call on functionalities of the central hardware unit (CPU), triggered by the first part, and the central hardware unit (CPU) executes a second part (P2) of the task forming a sub-part of the first part by a service processing thread ($T_S$).

20 Claims, 1 Drawing Sheet

(56) References Cited

U.S. PATENT DOCUMENTS

| | | | | |
|---|---|---|---|---|
| 7,865,697 B2* | 1/2011 | Machulsky | ............ | G06F 9/3879 712/34 |
| 8,458,680 B2* | 6/2013 | Crutchfield | ............. | G06F 8/443 717/136 |
| 8,918,770 B2* | 12/2014 | Ravi | ..................... | G06F 8/4441 717/140 |
| 8,943,505 B2* | 1/2015 | Chandhoke | ........... | G06F 9/4843 718/100 |
| 2003/0086300 A1* | 5/2003 | Noyes | ..................... | G06F 9/547 365/189.15 |
| 2007/0234007 A1 | 10/2007 | Lin et al. | | |
| 2009/0328078 A1 | 12/2009 | Siegemund et al. | | |
| 2010/0269110 A1* | 10/2010 | Leijen | ..................... | G06F 9/505 718/100 |
| 2011/0295862 A1* | 12/2011 | Taylor | ...................... | G06F 7/24 707/752 |
| 2012/0159480 A1 | 6/2012 | Matsuzawa | | |
| 2014/0215470 A1* | 7/2014 | Niguez | ................. | G06F 9/4843 718/102 |
| 2015/0113252 A1* | 4/2015 | Moy | ..................... | G06F 9/3851 712/215 |

OTHER PUBLICATIONS

Inoue et al., A robust seamless communication architecture for next-generation mobile terminals on multi-CPU SoCs, Feb. 2010, 28 pages.*

Sitaridi et al., Optimizing select conditions on GPUs, Jun. 2013, 8 pages.*

French Search Report dated Jun. 25, 2014, corresponding to the Foreign Priority Application No. 1359501.

* cited by examiner

DOUBLE PROCESSING OFFLOADING TO ADDITIONAL AND CENTRAL PROCESSING UNITS

FIELD OF THE INVENTION

The invention relates to data-processing platforms. More particularly, it relates to the offloading of processings to additional processing units.

CONTEXT OF THE INVENTION

In general, data-processing platforms comprise a generalist processing unit, called a CPU (Central Processing Unit) and memories. These memories contain applications and an Operating System, OS, especially for ensuring interactions between applications, the processing unit CPU and other aspects of the platform (input/output interfaces, etc.).

This model is very effective and especially very flexible since the same platform can deploy an almost infinite variety of software applications and can execute all sorts of tasks in the processing unit CPU.

However, the offloading of the execution of some tasks on peripheral processing units can bring advantages. First, this relieves the central unit (CPU) of these processings, and also benefits from more specialised architectures for a given type of task. This specialisation and the adequateness of the peripheral unit for the task to be executed ensures gains in performance.

This mechanism is generally known under the term hardware offloading which can be translated in French as "deport materiel".

Examples of such hardware offloading mechanisms can be found in the field of information networks, especially for implementation of protocol stacks TCP/IP.

The U.S. Pat. No. 5,355,453 titled "Parallel I/O Network File Server Architecture" describes a mechanism for processing offloading in the context of the protocol UDP ("User Datagram Protocol"). These principles have then been extended to the protocol TCP ("Transport Communication Protocol"). It is known to offload a strongly specialised part of the processing linked to a protocol stack TCP/IP on an additional dedicated hardware unit. This part of the processing is the calculation of control sums (or "checksum") which are necessary for encoding or decoding protocol packets.

Other examples of offloading are the offloading of the management of input/output in DMA architecture ("Direct Memory Access"), or else offloading of video coding and decoding ("CODEC"); etc.

These offloading mechanisms have some advantages, but their uses are made difficult by the restrictions based on the tasks which can be offloaded.

In fact, the task offloaded must be able to be fully carried out by the dedicated additional hardware unit. The very fact that it is dedicated to a type of processing limits those tasks which can be offloaded, and the possible evolutions and generalisations of these tasks.

This therefore requires offloading on this additional hardware unit only those tasks not likely to trigger processing not supported by the latter, or ensuring that this additional unit can also support a wide range of tasks. In both situations, executing the offloading mechanism is complex and costly for these reasons.

SUMMARY OF THE INVENTION

The aim of the present invention is to provide a solution at least partially rectifying the above drawbacks.

For this purpose, the present invention proposes a method for executing a task on a data-processing unit comprising a central hardware unit and an additional hardware unit, said task being executed by a processing thread of said central hardware unit, said method comprising:
  a step for offloading execution of a first part of said task to said additional hardware unit;
  a step by said additional hardware unit for calling on functionalities of said central hardware unit, triggered by said first part;
  an execution step of a second part of said task forming a sub-part of said first part by a service processing thread of said central hardware unit.

According to embodiments, the invention comprises one or more of the following characteristics which can be used separately or in partial combination or in total combination:
  said central hardware unit sends a notification to said additional hardware unit;
  on completion of the execution of said first part of said task, said additional hardware unit sends a notification to said central hardware unit;
  data transmissions between said additional hardware unit and said central hardware unit transit via an operating system executed by said central hardware unit.

Another aspect of the invention relates to a computer program comprising instructions which once loaded onto an information-processing system are adapted to implement the method described earlier.

Another aspect of the invention relates to a data-processing system, comprising a central hardware unit and an additional hardware unit, said central hardware unit being adapted to execute a task by a processing thread, and to trigger offloading of execution of a first part of said task to said additional hardware unit, and wherein said additional hardware unit is adapted to call on functionalities of said central hardware unit, triggered by said first part, and said central hardware unit executes a second part of said task forming a sub-part of said first part by a service processing thread.

According to embodiments, this system comprises one or more of the following characteristics which can be used separately or in partial combination or in total combination:
  on completion of the execution of said second part of said task, said central hardware unit sends a notification to said additional hardware unit;
  on completion of the execution of said first part of said task, said additional hardware unit sends a notification to said central hardware unit;
  the data transmissions between said additional hardware unit and said central hardware unit transit via an operating system executed by said central hardware unit;
  the system further comprises a communication bus for data transmissions between said additional hardware unit and said central hardware unit.

Other characteristics and advantages of the invention will emerge from the following description of a preferred embodiment of the invention, given by way of example and in reference to the appended drawings.

DETAILED DESCRIPTION OF THE INVENTION

Figure 1:
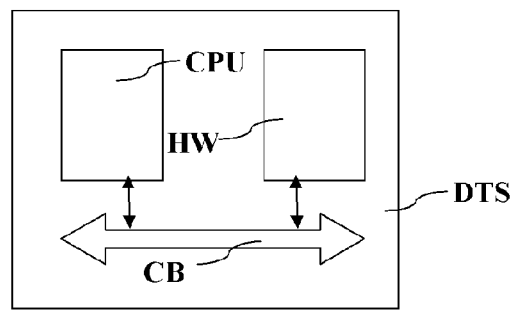
FIG. 1 schematically illustrates an example of architecture according to an embodiment of the invention.

As shown in the example of FIG. 1, the data-processing system DTS comprises a central hardware unit CPU and an additional hardware unit HW. They can be connected by a communication bus CM which ensures transmission of data between these two units, and optionally with other units, not shown.

The central hardware unit CPU executes tasks. These tasks can be also called processes and can be defined as a set of instructions to be executed, loaded into the volatile memory (RAM) of a processing unit, and generally an addressing space in volatile memory for storing the stack, work data, etc. The task is typically stored in non-volatile memory and loaded into volatile memory at the time of execution.

The tasks are executed by the central hardware unit (or processor) CPU by means of an operating system OS. The operating system is a set of instructions responsible for allocating resources (memory, processor time, input/output . . . ) necessary for the different tasks, ensuring that the functioning of one task does not interfere with that of the others, providing simplified and uniform tasks with access means to the different hardware means deployed in the processing system DTS, etc.

In a certain way, the operating system OS also comprises tasks, but these "tasks" will be called computer programs other than the operating system OS but operating with its support.

The central hardware unit CPU is typically a processor or a set of processors. These processors are generalist hardware units adapted to execute various tasks and are typically microprocessors.

The operating system OS is also adapted to execute these various tasks. Examples of operating systems comprise Microsoft Windows systems, Unix family systems, systems for onboard systems such as Google Android, Apple iOS, etc.

Central hardware units CPU and the operating systems are generally "multi-thread" or "multithread" according to current English terminology. They are capable of managing several execution threads associated with a task or part of a different task.

Some operating systems can be dedicated (or adapted) to microprocessors and particular data-processing systems DTS. This is especially the case of supercalculators for which architectures are specific and need the elaboration or the adaptation of a specific operating system. In this situation also, both the central hardware unit CPU and the operating system OS are generalist in the sense where they execute tasks whereof the content is varied and not known in advance.

The additional hardware unit HW is per se specifically dedicated to a type of task or to a reduced range of possible tasks. This adequacy of the task for the hardware unit executing it optimises the architecture of this unit to:
reduce costs;
increase performances, since the architecture is adapted to the task rather than provide for execution of all possible tasks.

The additional hardware unit HW and the central hardware unit CPU respond therefore to very different, or even contradictory, problems and architectural constraints.

An additional hardware unit HW can be adapted for example to encoding and decoding of audio or video data. Otherwise, it can execute a CODEC or part of a CODEC. This relieves the CPU central unit of this highly calculatory task and allows it to allocate machine time necessary for other tasks. Also, since the additional unit is adapted to this type of task, it is architectured as a function and produces superior yields (for example a higher encoding/decoding speed).

The central hardware unit CPU and the additional hardware unit HW can communicate in different ways known per se. In particular, a communication bus CM can ensure data transmission between the two hardware units. These data transmitted between the two units will be explained below; they comprise commands, notifications and any information flow enabling cooperation between one part of the task executed by the central unit and another part of the task executed by the additional unit.

Figure 2:
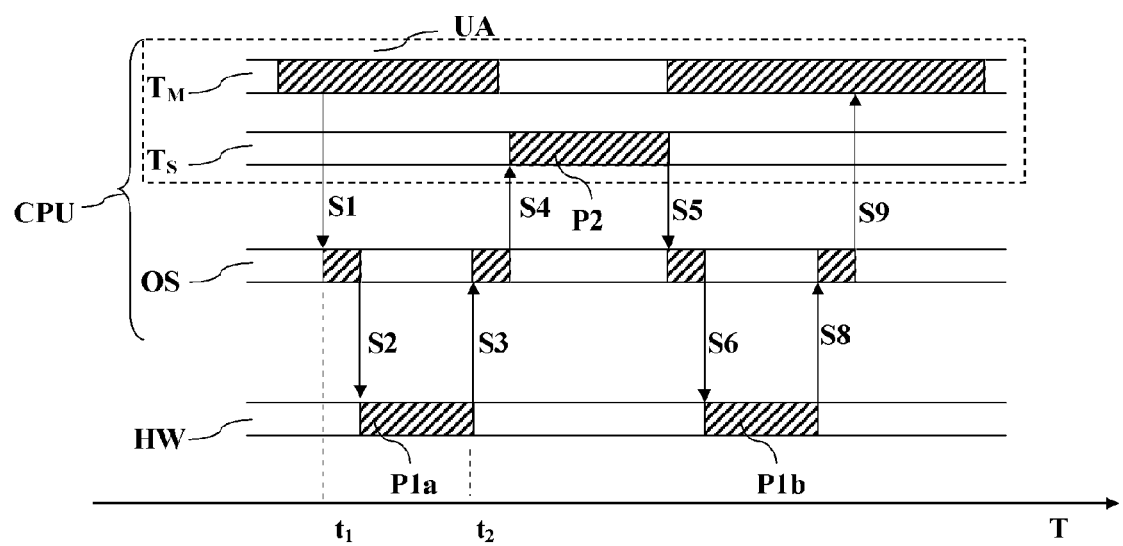
FIG. 2 schematically illustrates an example of execution over time of a method according to an embodiment of the invention.

FIG. 2 illustrates more precisely the sequencing of an offloading part of the processing. A task to be executed is illustrated by the hatched areas on the 4 time lines of the figure.

The task is initially executed by a processing thread $T_M$ of the central hardware unit CPU. The way in which it is triggered is conventional per se and beyond the scope of the present invention. This processing thread $T_M$ belongs to an applicative area UA of the central unit, by opposition to the system area associated with the operating system OS.

At the instant $t_1$, the task arrives at a part (P1a, P2, P1b) of the processing which can be the subject of execution offloading. Determination of the part which can be the subject of offloading is done by the task itself, in the program instructions constituting it.

The execution (or processing) thread $T_M$ triggers offloading by sending a request S1 destined for the additional hardware unit HW. This request contains information necessary for processing the part of the task forming the subject of the offloading. This information can especially contain data to be processed, or else the address of data to be processed, or a port where a flow of data to be processed, etc. arrives.

The request S1 can transit via the operating system OS of the central hardware unit CPU. The operating system can present a standardised interface for access to the offloading mechanism such that the task (and therefore the programmers) needs to know only the functionalities and capacities of the additional hardware unit(s) and not all the technical characteristics and especially the access ports, the way to deploy data etc.

In this case, the operating system OS receives the request S1 and, after a shaping function of the technical characteristics of the additional hardware unit, it sends them back (in this modified form) to the latter. Transmission can pass via the communication bus CB as specified earlier.

A bypass of the operating system OS ("OS Bypass") can also be provided. In this implementation, the processing thread $T_M$ communicates directly with the additional hardware unit HW to send it the request S1.

Once the information is received from the processing thread $T_M$ (directly or via the operating system OS), the additional hardware unit HW can execute the part of the task which is offloaded to it.

This offloading can interrupt execution of the processing thread $T_M$ if the latter has to wait for the results of execution of this part (P1*a*, P2, P1*b*) of the task to continue; or else execution of the processing thread $T_M$ continues in parallel with execution of the offloading of part of the task, as shown in FIG. 2.

During its execution, this part of the offloaded task determines that a sub-part needs functionalities of the central hardware unit CPU. These functionalities cannot be available on the more specialised additional hardware unit HW, or else not sufficiently effectively.

This can be the case when in processing specially dedicated to the additional hardware unit HW a particular case occurs which cannot be processed by the latter, or with difficulty only.

Another situation can consist of offloading a first part of the task, knowing that a sub-part needs the functionalities of the central unit CPU.

This method also allows the task (and therefore the programmers) to disregard this problem and have the mechanisms of the invention manage this transparently.

This method also more easily manages updates of the software integrated into the additional unit (<<firmware>>). In providing future updates, part of the processing can be offloaded, but a sub-part can be further executed by the central unit CPU while waiting for these updates.

In the example of FIG. 2, the additional hardware unit HW determines the need to call on the functionalities of the CPU central unit at an instant t2. This need is triggered by execution of a sub-part P1*a* of the task.

With sub-parts P2 and P1*b* this sub-part P1*a* forms the part of the task which has been offloaded onto the additional unit.

The sub-part P2 corresponds to the part of the task which has been offloaded to the additional unit but which the latter can (or not want) to execute and for which calling on the functionalities of the central unit CPU is required.

According to an embodiment of the invention, the additional hardware unit HW then sends an interruption S3 to the operating system OS of the central hardware unit CPU.

The operating system OS is provided to react to this interruption by sending the request to a service processing thread $T_S$.

The service thread $T_S$ executes the part P2 of the task which is sent to it, this part P2 therefore being a sub-part of the part offloaded.

The service thread can be executed on the same processor as the processing thread $T_M$ or on a different thread of the central hardware unit in the event where the latter is a multiprocessor. It can be interesting that the processing and service threads are executed by the same processor for reasons of performances because of the locality between the processor and the data to be processed.

The service thread $T_S$ can be created by the operating system OS or by the processing thread $T_M$ executing the task. In the latter case, the programme associated with the task can call on a library loaded by the program.

The part of task P2 can be executed by capitalising on the functionalities of the central unit CPU and not be restricted by the specificities of the additional units.

Also, the two threads can share the same software context of the task. It would be otherwise delicate to synchronise context data between the two units. Likewise, the service thread can also act with the same privileges as the task executed on the central unit, which is interesting and important in the event where the other hardware units do not have the same privileges.

On completion of execution of this second part P2 of the task, the central hardware unit CPU can send a notification S5, S6 to the additional hardware unit HW.

This notification can transit via the operating system OS or else be sent directly to the additional hardware unit HW.

The notification can contain a statute, indicating that execution on the service thread has occurred, but also results of this execution. These results can be necessary to trigger the repeating of execution of the task on the additional hardware unit (part P1*b*).

It should be noted that according to an embodiment of the invention, and according to the types of tasks to be executed it is quite possible that execution of part P1*a*/P1*b* of the task continues in parallel with execution of the second part P2 by the service thread $T_S$. The invention in effect covers different possible embodiments which can depend on applications.

In the same way, on completion of execution of the first part (P1*a*, P2, P1*b*) of the task, the additional hardware unit HW can transmit a notification S8, S9 to said central hardware unit CPU. This notification can transit via the operating system OS: it can be encouraged to modify the received notification S8 before sending it to the processing thread $T_M$ (notification S9).

Alternatively, the additional hardware mechanism HW cannot notify the processing thread $T_M$. In fact, in some situations, it is possible for the task to request offloading of execution of part of this task without being interested in termination of the latter. It is possible to provide for the processing thread $T_M$ to later transmit a stop command of the part offloaded of the task.

Of course, the present invention is not limited to the examples and embodiment as described and illustrated, but it is susceptible de many variants accessible to those skilled in the art.

The invention claimed is:

1. A method for executing a task on a data-processing system including a central hardware unit and an additional hardware unit, said task being executed by a processing thread of said central hardware unit, said method comprising:
    an offloading step of execution of a first part of said task to said additional hardware unit;
    a step by said additional hardware unit for calling on functionalities of said central hardware unit that are triggered by a triggering sub-part of said first part, by the additional hardware unit;
    an offloading step, during execution of the first part, of a second part that is a sub-part of the first part, from the additional hardware unit to the central hardware unit, the second part being different from the triggering sub-part of the first part; and
    an execution step of execution of the second part, by a service processing thread of said central hardware unit,
    wherein the triggering sub-part of the first part is not offloaded from the additional hardware unit to the central hardware unit.

2. The method according to claim 1, wherein, on completion of execution of said second part of said task, said central hardware unit sends a notification to said additional hardware unit.

3. The method according to claim 2, wherein, on completion of execution of said first part of said task, said additional hardware unit sends a notification to said central hardware unit.

4. The method according to claim 2, wherein data transmissions between said additional hardware unit and said central hardware unit transit via an operating system executed by said central hardware unit.

5. The method according to claim 1, wherein, on completion of execution of said first part of said task, said additional hardware unit sends a notification to said central hardware unit.

6. The method according to claim 5, wherein data transmissions between said additional hardware unit and said central hardware unit transit via an operating system executed by said central hardware unit.

7. The method according to claim 1, wherein data transmissions between said additional hardware unit and said central hardware unit transit via an operating system executed by said central hardware unit.

8. A computer program comprising instructions stored in a non-transitory computer-readable medium, which, once loaded onto an information-processing system, are configured to implement the method according to claim 1.

9. A data-processing system, comprising:
a central hardware unit; and
an additional hardware unit,
wherein the central hardware unit is configured to execute a task by a processing thread and to trigger offloading of execution of a first part of said task to said additional hardware unit,
the additional hardware unit is configured to call on functionalities of said central hardware unit, triggered by a triggering sub-part of said first part,
during execution of the first part, a second part is offloaded from the additional hardware unit to the central hardware unit, the second part being a sub-part of the first part, the second part being different from the triggering sub-part of the first part, and
said central hardware unit executes the second part by a service processing thread,
wherein the triggering sub-part of the first part is not offloaded from the additional hardware unit to the central hardware unit.

10. The data-processing system according to claim 9, wherein, on completion of execution of said second part of said task, said central hardware unit sends a notification to said additional hardware unit.

11. The data-processing system according to claim 10, wherein, on completion of execution of said first part of said task, said additional hardware unit sends a notification to said central hardware unit.

12. The data-processing system according to claim 10, wherein data transmissions between said additional hardware unit and said central hardware unit transit via an operating system executed by said central hardware unit.

13. The data-processing system according to claim 10, further comprising a communication bus for data transmissions between said additional hardware unit and said central hardware unit.

14. The data-processing system according to claim 9, wherein, on completion of execution of said first part of said task, said additional hardware unit sends a notification to said central hardware unit.

15. The data-processing system (DTS) according to claim 14, wherein data transmissions between said additional hardware unit (HW) and said central hardware unit (CPU) transit via an operating system (OS) executed by said central hardware unit.

16. The data-processing system (DTS) according to claim 14, further comprising a communication bus for data transmissions between said additional hardware unit and said central hardware unit.

17. The data-processing system according to claim 9, wherein data transmissions between said additional hardware unit and said central hardware unit transit via an operating system executed by said central hardware unit.

18. The data-processing system according to claim 9, further comprising a communication bus for data transmissions between said additional hardware unit and said central hardware unit.

19. A computer program comprising instructions stored in a non-transitory computer-readable medium, which, once loaded onto an information-processing system, are adapted to implement the method according to claim 2.

20. A computer program comprising instructions stored in a non-transitory computer-readable medium, which, once loaded onto an information-processing system, are adapted to implement the method according to claim 5.

* * * * *